United States Patent
Hartley et al.

[11] Patent Number: 5,903,664
[45] Date of Patent: *May 11, 1999

[54] FAST SEGMENTATION OF CARDIAC IMAGES

[75] Inventors: Richard Ian Hartley, Schenectady; Rupert William Meldrum Curwen, Ballston Lake; Harvey Ellis Cline, Schenectady, all of N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/794,981

[22] Filed: Feb. 5, 1997

Related U.S. Application Data

[60] Provisional application No. 60/029,967, Nov. 1, 1996.

[51] Int. Cl.$^6$ ................................ G06K 9/00
[52] U.S. Cl. ................................ 382/154
[58] Field of Search ................... 382/154, 171, 382/172, 173, 128, 130, 131, 132, 260, 261, 272, 270, 204; 324/309, 307; 364/413.3, 418, 518, 555

[56] References Cited

U.S. PATENT DOCUMENTS

| | | | |
|---|---|---|---|
| 4,662,380 | 5/1987 | Riley | 128/660 |
| 4,710,876 | 12/1987 | Cline et al. | 364/414 |
| 4,751,643 | 6/1988 | Lorensen et al. | 364/414 |
| 4,914,589 | 4/1990 | Crawford | 364/43.17 |
| 4,995,394 | 2/1991 | Cline et al. | 128/632 |
| 5,204,625 | 4/1993 | Cline et al. | 324/306 |
| 5,273,040 | 12/1993 | Apicella et al. | 128/653.2 |

OTHER PUBLICATIONS

"Constrained Deformable Superquadrics and Non–Rigid Motion Tracking" by D. Metaxas and D. Terzopoulos, IEEE Computer Vision and Pattern Recognition, pp. 337–343, 1991.

"Discriminant and Least–Squares Threshold Selection" by Nobuyuki Otsu, Proceedings of the Fourth International Joint Conference on Pattern Recognition, Kyoto, Japan, 1978, pp. 592–596.

*Primary Examiner*—Jose L. Couso
*Assistant Examiner*—Duy M. Dang
*Attorney, Agent, or Firm*—Marvin Snyder; Douglas E. Stoner

[57] ABSTRACT

A cardiac segmentation system acquires a series of images acquires as slices through a volume, and as images at different time periods throughout a cardiac cycle. It displays an image to an operator which interactively selects a region of interest (ROI) of the image to be segmented, such as the left ventricle. A seed point is also selected within the ROI and the structure desired to be segmented. The image is then thresholded by a masking device classifying points within the ROI as above the threshold, or not above the threshold. A 3D connectivity device identifies points within the ROI having the same classification as an expanded seed point which are also contiguous with the seed point as the segmented structure. The segmented structure is expanded and a histogram is constructed. A new threshold is selected which separates modes of the histogram, and used to carry out a revised, final, segmentation of the current image. The centroid of the current image is used as a seed point in segmenting adjacent images. Similarly, the current threshold is used as an initial threshold for adjacent images. The previous seed point and ROI may also be used. This is repeated for a number of images to result in segmented structures may then be stored, displayed and used in calculating heart functionality.

8 Claims, 1 Drawing Sheet

FAST SEGMENTATION OF CARDIAC IMAGES

CROSS REFERENCE TO PENDING APPLICATIONS

This is a continuation application of U.S. Provisional patent application Ser. No. 60/029,967 filed Nov. 1, 1996, entitled "Fast Segmentation Of Cardiac Images" by Richard I. Hartley, Rupert W. Curwen, and Harvey E. Cline, and claims an effective filing date of that of the parent case.

BACKGROUND OF THE INVENTION

1. Scope of the Invention

The present invention relates to image processing and more specifically to segmenting 3D structures from a series of cardiac images.

2. Related Prior Art

Medical images of a subject's heart typically are comprised of several slices throughout the 3-D volume of the heart. In addition, the heart may be imaged at several different instants (phases) in the cardiac cycle. Thus the ensemble of all images gives a picture of the heart during the complete course of one heart beat.

It is often desirable to use this set of images to extract quantitative information about the heart motion useful in medical diagnosis. Such information includes measurement of the cardiac blood volume, the ejection fraction and the amount of wall motion. It is necessary to detect and differentiate different contiguous anatomical regions of the heart to perform this measurement. Identification of contiguous regions of the same material is known as segmentation. It is particularly important to be able to segment, and measure blood volume in a subject's heart chambers for diagnosis of heart disease.

Segmentation of the left ventricle is particularly important because of its important physiological function.

Other methods have been used for extracting the left ventricle in a medical image set. One method is to model the volume as a polyhedron, and vary modeling parameters to induce the model to conform with the measured blood mass, as set forth in "Constrained Deformable Superquadrics And Non-Rigid Motion Tracking", by D. Metaxas and D. Terzopoulos, *IEEE Computer Vision and Pattern Recognition*, pp. 337–343, 1991.

3D templates may also be used instead of a polyhedron. Methods using 3D templates tend to be very slow, and at present, are unsuitable for clinical use.

An alternative method is to model the ventricle wall by a curve in each image and to carry out segmentation one image at a time. These techniques are generally known as "snake" techniques. Their disadvantage is that they are generally quite dependent upon initial unknown parameters. Also, convergence speed is an issue.

Simple thresholding has also been used for extracting regions of images. A method of selecting a threshold for separating an image into two regions according to intensity has been described by Nobuyuki Otsu in "Discriminant and Least-Squares Threshold Selection" *Proceedings of the Fourth international Joint Conference on Pattern Recognition*, Kyoto Japan, 1978, pp. 592–596. This algorithm will be referred to as DTSM thresholding. Thresholding using a single threshold across all slices and phases is usually unsuccessful because of image intensity changes from image to image. These intensity changes are caused by different blood flow velocities, and changing imaging parameters.

Currently, there is a need for a more accurate system which segments structures within 3D volume images acquired at different time periods of a cycle.

SUMMARY OF THE INVENTION

The present invention receives a plurality of slice images of a desired volume which are acquired over a plurality of phases of a period cycle. This may be magnetic resonance (MR) angiography images of the heart acquired at different times throughout the cardiac cycle. These images are segmented into 3D anatomical structures over time.

Initially a region of interest (ROI) and a seed point within the ROI, and an initial threshold are identified. Starting with an initial image acquired at an initial slice and phase, points of the image within the ROI are classified as being above the threshold, and not above the threshold.

Contiguous points having the same classification as the seed point, being connected to the seed point through points all having this same classification, are identified defining a segmented structure in this image.

The segmented structure within the image is expanded by a predetermined amount to result in an expanded region. A histogram of the intensities of the expanded region is determined. An adjusted threshold which separates modes of the histogram is then selected. An image adjacent in phase or in space, next to the current image is then selected.

The steps of classifying the intensities with respect to the new adjusted threshold, and the determination of points of the same classification connected to the seed point are determined. This results in another segmented structure. This is repeated for a plurality of images to result in a 3D segmented structure over time. By interpolating intermediate images, a short movie may be constructed showing the motion of the structure over the cycle.

OBJECTS OF THE INVENTION

An object of the present invention is to provide a system which identifies segmented structures in a plurality of images acquired over a given volume over a time period.

BRIEF DESCRIPTION OF THE DRAWINGS

The features of the invention believed to be novel are set forth with particularity in the appended claims. The invention itself, however, both as to organization and method of operation, together with further objects and advantages thereof, may be best understood by reference to the following description taken in conjunction with the accompanying drawing in which:

DETAILED DESCRIPTION OF THE INVENTION

Figure 1:
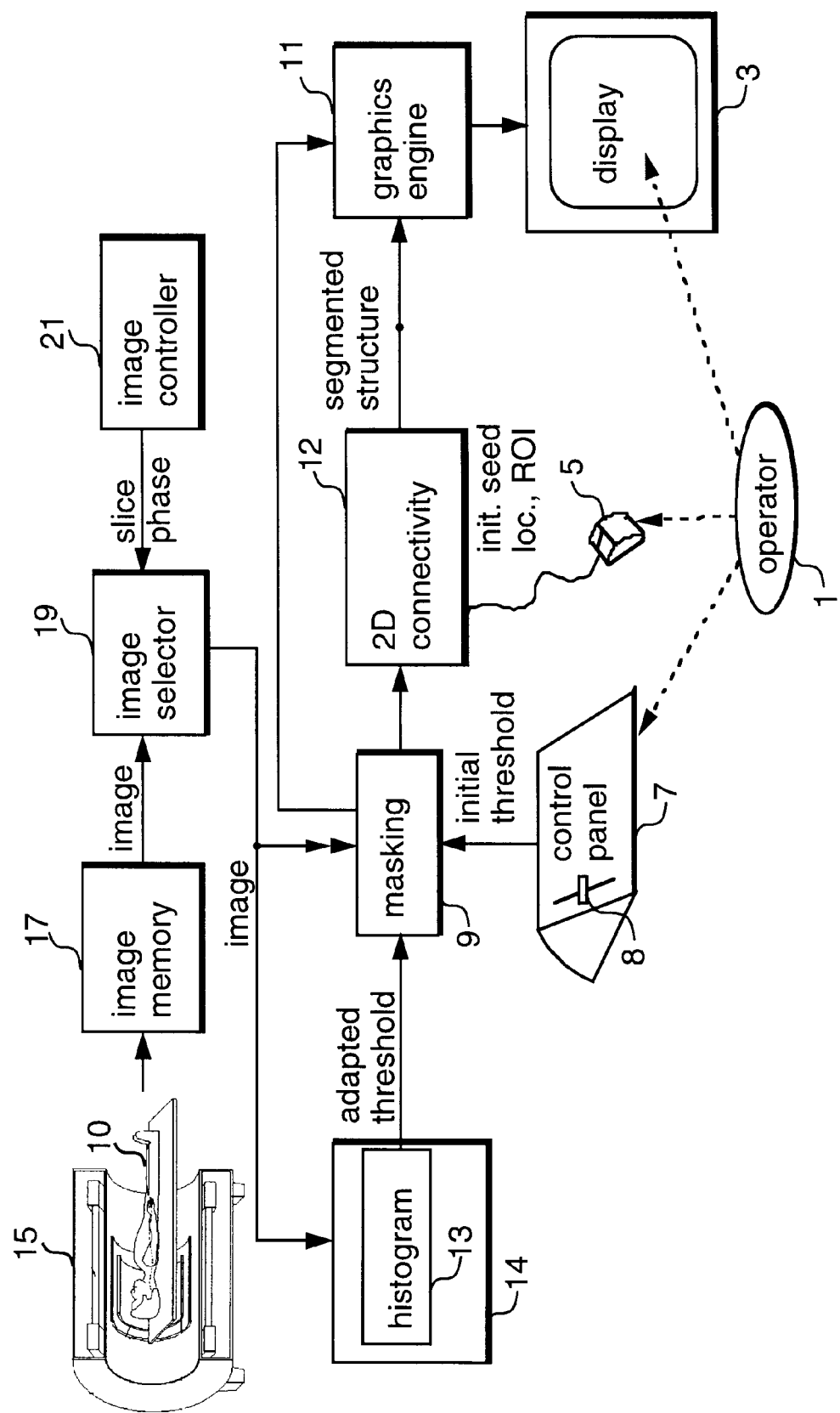
FIG. 1 is a simplified block diagram of an embodiment of the present invention.

The present invention employs adaptive thresholding, where the blood volume is extracted by thresholding, but the threshold may vary from slice to slice, or from phase to phase.

A threshold can be used only locally within a region of interest (ROI) to identify the left-ventricular blood mass, since there will be other regions of the image that will also be sufficiently bright to lie above the intensity threshold. For example, the blood of the right ventricle will have an intensity similar to that of the left ventricle. Thus, global thresholding of the entire image is not sufficient to segment the left ventricular blood volume.

The following characteristics are useful in segmenting the left-ventricular blood volume:
1. In each image, (i.e. a single slice and phase) the blood may be distinguished from the surrounding tissue on the basis of image intensity.
2. In each image, the blood pool is a connected set.
3. The threshold used to segment each image will be close to the threshold used for images in neighboring phases and slices.
4. The image of the left-ventricle blood pool will not move very far from one slice to the next, or from one phase to the next.

In FIG. 1, a medical imaging device 15 acquires a plurality of slice images of subject 10 at a plurality of phases throughout a periodic cycle, such as the cardiac cycle. Medical imaging device 15 may be a magnetic resonance (MR) imaging A threshold update device 14 determines the best threshold to separate these two regions. There are many different conventional methods of determining a threshold. In one embodiment the threshold-update device 14 contains a histogram device 13 which device obtaining angiography data sets of various phases of a cardiac cycle.

The blood in the left ventricle of a subject which was imaged will have a different intensity level from that of the surrounding tissue. This intensity difference is often sufficient to allow the identification of the ROI of the image corresponding to the blood mass by thresholding alone.

Throughout the following description it is assumed that the blood is bright (high intensity), although dark-blood images may also be used, and may also be segmented by the present invention by using a different threshold, or by inverting the intensity of the image.

The images from medical imaging device 15 are stored in a memory 17.

An image controller 21 determines which phase and image is to be processed next and passed the slice and phase to an image selector 19 which finds the image in memory 17 and provides the image to a masking device 9. Image controller typically selects an adjacent image, in time or in space. Adjacent images here means physically adjacent slices for the same phase (acquisition time), or the same slice for an image acquired in the next previous, or next subsequent time period, adjacent phase.

A masking device 9 receives the ROI and a threshold, and classifies points within the ROI as being over the threshold, or not over the threshold. To avoid the situation where the seed point itself lies below the threshold, the seed is expanded by a predetermined number of pixels, for example, 5 pixels, to reduce the chance that it lies inside a small low-intensity region.

The classified points within the ROI, and a seed point are passed to a 2D connectivity device 12 which determines contiguous points having the same classification which also encompass the seed point. The connected components are computed using a conventional connectivity algorithm starting with a small neighborhood of the seed point. The set of all connected locations within the ROI within the same thresholded range are considered to be a segmented structure.

The contiguous points, also contiguous with the seed point, determined by 2D connectivity device 12 are provided to a graphics engine 11 which displays these points on a display 3 to an operator 1.

Initialization

Initialization may be performed by manually specifying the following for one image in the image set:
1. a region of interest (ROI) large enough to contain the region to be segmented in all the images;
2. a seed point in the interior of the region to be segmented (for instance, the left ventricle); and
3. a threshold that accurately separates the intensities in the region to be segmented from the intensities of the surrounding tissue.

The ROI may be identified with operator 1 interactively positioning a pointing device 5 to draw a rectangle or an ellipse, in the manner such as those in conventional drawing programs, while viewing a visual display 3.

The seed point is a single point specified by operator 1 in the interior of the ROI, which also may be indicated with pointing device 5.

The threshold is input by appropriate means, such as by manipulating a slider bar 8, on a control panel 7.

In a preferred embodiment, each position of the slider bar specifies a particular threshold value. When slider bar 8 is moved to a new value, the part of the image inside the ROI is segmented by the remainder of the system, and the connected component of the above-threshold points within the ROI containing a small neighborhood of the seed point is displayed on the screen in a new color. By moving slide bar 8, operator 1 interactively selects a threshold for which the segmented region thus displayed corresponds to a segmented structure within the ROI, such as the interior of the ventricle. This threshold value is taken as the initial threshold.

This initialization of the ROI, seed point and initial threshold may be performed for one image only, and subsequent automatic processing will track this region through the other images to get a complete 4 d (3 spatial dimensions, plus time) segmentation of structures within the ROI.

Adjusting the Threshold

After the initial image has been processed, the thresholded regions approximate the interior of the region being sought (the ventricle). However, because of variation of threshold from slice to slice, it is possible that a different threshold should be used than the initial threshold estimate, which was provided by interactive initialization, or that propagated from the adjacent slice. For this reason, a new estimate of the threshold is sought, which will provide the best separation of the interior of the ventricle region from the exterior.

The original thresholded region determines the interior of the ventricle (approximately). By expanding this by 5 pixels, we include part of the cardiac wall, or septum, i.e. non-interior region is included. The histogram of this region will be bi-modal, as required, containing both interior and exterior pixels.

A threshold update device 14 determines the best threshold to separate these two regions. There are many different conventional methods of determining a threshold. In one embodiment the threshold-update device 14 contains a histogram device 13 which expands the segmented structure by a predetermined amount. It then calculates a histogram of intensities in the expanded region is constructed and the best threshold to separate the histogram into two ranges is computed.

If the histogram is bi-modal, then histogram device 13 may employ a DTSM algorithm as described in the paper: the above-referenced paper by Nobuyuki Otsu for selecting an adjusted threshold. Other conventional techniques may also be used.

The histograms of all the phases in one slice may be added together before computing the threshold, or thresholds may be computed for each image individually.

When the adjusted threshold has been computed it is used in masking device 9 to segment the current image a second time resulting in an updated segmented image.

In one embodiment, the threshold is adapted for different slices with all phases of that slice using the same threshold.

In a second embodiment, the threshold is adapted for different phases with all slices of that phase using the same threshold.

In a third embodiment, thresholds are adapted for each phase image in a slice, and from slice to slice. This requires more processing, but should provide a cleaner image.

Other Images

This adjusted threshold is then used as the threshold by masking device 9 on the next adjacent image. The last processed image is used to determine a centroid and ROI. The centroid of the current image is used as a seed point for the next adjacent image.

Once all phases of all slices are segmented, the 2D segmentation outline of each slice for a given phase may be used to construct a 3D surface and smoothed by conventional techniques. This would result in a 3D solid object for each phase. Playing back the phases and interpolating intermediate phases would result in a 3D movie of the segmented volume. This would be very useful in determining, weakened, or damaged heart muscle.

While several presently preferred embodiments of the novel invention has been described in detail herein, many modifications and variations will now become apparent to those skilled in the art. It is, therefore, to be understood that the appended claims are intended to cover all such modifications and variations as fall within the true spirit of the invention.

What is claimed is:

1. An image segmentation system for segmenting a set of volumetric images acquired over a plurality of phases during a cycle into structures comprising:

a) an image memory having a said prestored set of volumetric data representing "slices" of images acquired over a plurality of phases;

b) a masking device for interactively receiving an operator-defined threshold, and an image slice operating to create a threshold image displayed to an operator showing pixels having a value either above or below the threshold;

c) a 2D connectivity device coupled to masking device, for receiving a threshold from the masking device, an operator-defined seed point and region of interest (ROI), and an image slice, operating to segment the volumetric images by determining contiguous points of the image starting in a predetermined vicinity of the seed point which are within the ROI and have values above the threshold, being a segmented structure;

d) an image selector coupled to the image memory and the masking device for selecting one of the image slices as a current image from the image memory and passing it to the masking device to produce a threshold image;

e) a threshold-update device coupled to the masking device and the image selector, operating to receive the current image slice, a plurality of images adjacent to the current image slice in time or in space, the segmented structure and the ROI, analyze the intensities of pixels in the segmented structure and in a neighborhood of said segmented structure and compute an updated threshold, which is provided to the 2D connectivity device to segment the current image slice a second time, said updated threshold being also used as an initial threshold for adjacent image slices; and f) a threshold update device coupled to the masking device and the image selector, operating to receive a plurality of adjacent image slices of the segmented structure for a plurality of phases, operating to expand the segmented structure by a predetermined amount, create a histogram of pixel values of at least one of the slices of the expanded segmented structure, and determine a threshold which will separate peaks of the histogram, and provide this threshold to the masking device for subsequent segmentation of an adjacent slice.

2. The image segmentation system of claim 1 in wherein the threshold-update device operates to receive a plurality of image slices adjacent in space, expand the segmented structure by a predetermined amount, create a histogram of the pixels of the expanded segmented structure effectively space filtering, determine an updated threshold which separates peaks of the histogram, and provide this adjusted threshold to the masking device to be used in segmenting the image a second time.

3. The image segmentation system of claim 1 further comprising:

a control panel coupled to the masking device allowing operator definable input, including the initial threshold, the seed point, and the ROI.

4. The image segmentation system of claim 1 further comprising:

a) a display device for displaying visual images of graphics signals provided to it;

b) a graphics engine coupled to the display device, the masking device, and the 2D connectivity device for interactively creating a graphics signal of the threshold image, and the segmented structure based upon the operator defined input, and displaying these signals on the display device.

5. The image segmentation system of claim 1 in wherein the threshold-update device operates to receive a plurality of image slices adjacent in time, expand the segmented structure by a predetermined amount, create a histogram of the pixels of the expanded segmented structure effectively time-filtering, determine an updated threshold which separates peaks of the histogram, and provide this adjusted threshold to the masking device to be used in segmenting the image a second time.

6. A method of segmenting a plurality of slice images of a desired volume acquired over a plurality of phases of a period cycle, into anatomical structures comprising the steps of:

a) selecting an initial image to be the current image acquired at an initial slice and phase;

b) selecting an initial threshold;

c) displaying the set of points having values either above, or below the threshold, as a threshold image;

d) selecting an initial region of interest (ROI) and a seed point within the ROI on the threshold image;

d) classifying point of the image within the ROI as being above the threshold and not above the threshold;

f) identifying a region of contiguous points having the same classification as the seed point, being connected to the seed point through points all having this same classification, defining a segmented structure in this image;

g) analyzing pixels in the segmented structure and in a neighborhood of the segmented structure to determine an updated threshold by:

i. expanding the segmented structure in a plurality of images for the same phase/slice by a predetermined amount to result in an expanded region; and
ii. determining a histogram of the intensities of the expanded region in the plurality of images effectively filtering in time/space, respectively;
iii. selecting an adjusted threshold that separates modes of the histogram;

h) segmenting the current image again by repeating steps "e" and "g" to compute an updated threshold;
i) selecting an adjacent image, in phase or in space, next to the current image; and
j) repeating steps "e" →"i" using each successive updated threshold for a plurality of the images to result in a 3D segmented structure over a plurality of phases.

7. The method of segmenting a plurality of slice images of claim 6 in which the seed point and initial threshold used to segment all images except the first are the chosen comprising the steps of:

a) choosing a seed point for an image adjacent in time or space, to be a centroid of the updated segmented structure; and
b) choosing the initial threshold of the adjacent image as the updated threshold of the current image.

8. The method of segmenting a plurality of slice images of claim 7 in which the updated threshold is the same as the initial threshold.

* * * * *